United States Patent
Sakane et al.

(10) Patent No.: US 10,504,548 B2
(45) Date of Patent: Dec. 10, 2019

(54) IRON-BASED OXIDE MAGNETIC PARTICLE POWDER AND METHOD FOR PRODUCING IRON-BASED OXIDE MAGNETIC PARTICLE POWDER

(71) Applicant: DOWA ELECTRONICS MATERIALS CO., LTD., Tokyo (JP)

(72) Inventors: Kenji Sakane, Tokyo (JP); Tetsuya Kawahito, Tokyo (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 137 days.

(21) Appl. No.: 15/511,038

(22) PCT Filed: Sep. 17, 2015

(86) PCT No.: PCT/JP2015/076525
§ 371 (c)(1),
(2) Date: Mar. 14, 2017

(87) PCT Pub. No.: WO2016/047559
PCT Pub. Date: Mar. 31, 2016

(65) Prior Publication Data
US 2017/0287516 A1   Oct. 5, 2017

(30) Foreign Application Priority Data

Sep. 24, 2014 (JP) ................................. 2014-193255
Mar. 20, 2015 (JP) ................................. 2015-058817
Jul. 29, 2015 (JP) ................................. 2015-150104

(51) Int. Cl.
*G11B 5/65*   (2006.01)
*C01G 49/00*  (2006.01)
(Continued)

(52) U.S. Cl.
CPC .......... *G11B 5/653* (2013.01); *C01G 49/0018* (2013.01); *C01G 49/06* (2013.01);
(Continued)

(58) Field of Classification Search
None
See application file for complete search history.

(56) References Cited

U.S. PATENT DOCUMENTS 8,072,365 B2* 12/2011 Ohkoshi ............... B82Y 30/00
                                                 252/62.51 R
8,444,872 B2*  5/2013 Ohkoshi ............... B82Y 30/00
                                                    252/62.53
2006/0283290 A1* 12/2006 Hattori .................. H01F 1/065
                                                        75/348

FOREIGN PATENT DOCUMENTS

JP   2008-100871   5/2008
JP   2008-174405   7/2008
(Continued)

*Primary Examiner* — Kevin M Bernatz
(74) *Attorney, Agent, or Firm* — Clark & Brody (57) ABSTRACT

An e-type iron-based oxide magnetic particle powder has narrow particle size distribution and has a low content of fine particles which do not contribute to magnetic recording characteristics. As a result, a narrow coercive force distribution is achieved and the powder is suitable for increasing recording density of a magnetic recording medium. The powder containing substituting metal elements can be obtained by: adding an alkali to an aqueous solution containing trivalent iron ions and ions of the metals for partially substituting Fe sites to neutralize the aqueous solution to a pH of 1.5 to 2.5; then adding a hydroxycarboxylic acid; further adding the alkali to neutralize the aqueous solution to a pH of 8.0 to 9.0; washing with water a precipitation of an iron oxyhydroxide containing the substituting metal ele-
(Continued)

(a) B-H Curve (b) Differential B-H Curve ments produced; and coating the iron oxyhydroxide containing the substituting metal elements with a silicon oxide and heating the resultant.

17 Claims, 5 Drawing Sheets

(51) Int. Cl.
| | | |
|---|---|---|
| C01G 51/00 | (2006.01) | |
| H01F 1/11 | (2006.01) | |
| C01G 49/06 | (2006.01) | |
| G11B 5/706 | (2006.01) | |
| G11B 5/714 | (2006.01) | |
| B82Y 25/00 | (2011.01) | |
| B82Y 40/00 | (2011.01) | |
| B82Y 30/00 | (2011.01) | |

(52) U.S. Cl.
CPC .......... *C01G 51/40* (2013.01); *G11B 5/70642* (2013.01); *G11B 5/714* (2013.01); *H01F 1/11* (2013.01); *B82Y 25/00* (2013.01); *B82Y 30/00* (2013.01); *B82Y 40/00* (2013.01); *C01P 2002/50* (2013.01); *C01P 2002/52* (2013.01); *C01P 2002/72* (2013.01); *C01P 2004/04* (2013.01); *C01P 2004/51* (2013.01); *C01P 2004/64* (2013.01); *C01P 2006/42* (2013.01); *Y10S 977/773* (2013.01); *Y10S 977/811* (2013.01); *Y10S 977/896* (2013.01); *Y10S 977/943* (2013.01)

(56) References Cited

FOREIGN PATENT DOCUMENTS

| | | | | |
|---|---|---|---|---|
| JP | 2011-032496 | 2/2011 | | |
| WO | 2008/029861 | 3/2008 | | |
| WO | WO-2008029861 A1 * | 3/2008 | ............ | B82Y 30/00 |
| WO | 2008/149785 | 12/2008 | | |
| WO | WO-2008149785 A1 * | 12/2008 | ............ | B82Y 30/00 |
| WO | 2014/175387 | 10/2014 | | |

* cited by examiner

(a) B-H Curve (b) Differential B-H Curve

(a) B-H Curve

(b) Differential B-H Curve

IRON-BASED OXIDE MAGNETIC PARTICLE POWDER AND METHOD FOR PRODUCING IRON-BASED OXIDE MAGNETIC PARTICLE POWDER

TECHNICAL FIELD

The present invention relates to an iron-based oxide magnetic particle powder suitable for high density magnetic recording mediums, radio wave absorbers, and the like, in particular, to a particle powder in which a mean particle diameter of particles is in the order of nanometers, and a method for producing the same.

BACKGROUND ART $\epsilon$-Fe$_2$O$_3$ is an extremely rare phase in iron oxides, and since particles having a size of the order of nanometers show a huge coercive force (Hc) of approximately 20 kOe (1.59× 10$^6$ A/m) in room temperature, a production method in which $\epsilon$-Fe$_2$O$_3$ is synthesized in a single phase has been conventionally studied (PTL 1). When $\epsilon$-Fe$_2$O$_3$ is used in a magnetic recording medium, there is no magnetic head material having a saturation magnetic flux density of a high level responding thereto at this time. Accordingly, control of the coercive force is being conducted by substituting a part of Fe sites of $\epsilon$-Fe$_2$O$_3$ with a trivalent metal such as Al, Ga, and In, and the like, and the relation between the coercive force and the radio wave absorption characteristic is being analyzed (PTL 2).

On the other hand, in the field of magnetic recording, a magnetic recording medium having a high ratio of reproduced signal level and particulate noise (C/N ratio: Carrier to Noise Ratio) is being developed, and for increasing recording density, reduction of the size of the magnetic particles forming a magnetic recording layer is demanded. In general, however, the reduction of the size of the magnetic particles is likely to cause deterioration in environmental stability and thermal stability, and there is a concern of deterioration in magnetic characteristics of the magnetic particles in the use and storage environments. Therefore, by substituting a part of Fe sites of $\epsilon$-Fe$_2$O$_3$ with another metal superior in heat resistance, there are developed various kinds of partially substituted product of $\epsilon$-Fe$_2$O$_3$ which are represented by the general formula $\epsilon$-A$_x$B$_y$Fe$_{2-x-y}$O$_3$ or $\epsilon$-A$_x$B$_y$C$_z$Fe$_{2-x-y-z}$O$_3$ (wherein, A represents a divalent metal element such as Co, Ni, Mn, and Zn, B represents a tetravalent metal element such as Ti, and C represents a trivalent metal element such as In, Ga, and Al), which make it possible to reduce the particle size and allow the coercive force variable, and which is also superior in environmental stability and thermal stability (PTL 3).

Since $\epsilon$-Fe$_2$O$_3$ is not a thermodynamically stable phase, a specific method is required for producing the same. PTLs 1 to 3 mentioned above disclose a production method of $\epsilon$-Fe$_2$O$_3$ in which fine crystals of iron oxyhydroxide produced by a liquid phase method are used as a precursor, and after coating the precursor with a silica by a sol-gel method, the precursor is subjected to a heat treatment, and as the liquid phase method, a reverse micelle method in which an organic solvent is used as a reaction medium, and a method in which only an aqueous solution is used as a reaction medium are disclosed.

CITATION LIST

Patent Literature

PTL 1: JP-A-2008-174405
PTL 2: WO2008/029861
PTL 3: WO2008/149785

SUMMARY OF INVENTION

Technical Problem

Although $\epsilon$-Fe$_2$O$_3$ or an $\epsilon$-type iron-based oxide obtained by partially substituting Fe therein produced by the related-art production methods disclosed in PTLs 1 to 3 mentioned above has excellent magnetic characteristics, variations in coercive force distribution are sometimes observed depending on the production conditions. As a result of intensive studies of the present inventors, it has been found that $\epsilon$-Fe$_2$O$_3$ or an $\epsilon$-type iron-based oxide obtained by partially substituting Fe therein produced by the related-art production methods has a wide particle size distribution and contains a large amount of much finer particles relative to the mean particle diameter, and that the fine particles have a lower coercive force and when used in a magnetic recording medium, the fine particles do not contribute to enhancing the recording density.

Specifically, two peaks are observed in a curve obtained by numerically differentiating a magnetic hysteresis loop (B-H curve) measured on the magnetic powder obtained by the related-art method (hereinafter, referred to as a differential B-H curve). It is considered that a magnetic powder corresponding to a peak appearing at a position of a higher magnetic field applied of the two peaks, that is, to a higher Hc component, contributes to the magnetic recording, but a magnetic powder corresponding to a peak appearing at a position of a lower magnetic field applied, that is, to a lower Hc component does not contribute to the magnetic recording. By the present inventors' studies, it has been confirmed that when the content of the fine particles mentioned above is reduced, the peak of the lower Hc component in the differential B-H curve is lowered.

The reason why Hc of the fine particles is lower is currently unclear, but either of the inclusion of a different phase from the $\epsilon$-type iron-based oxide, such as $\alpha$-type iron-based oxide and $\gamma$-type iron-based oxide, or superparamagnetism due to the smaller particle size is inferred as the reason.

In either case, since the fine particles above do not contribute to enhancing magnetic characteristics of the iron-based oxide magnetic particle powder, it has been found that the content thereof has to be reduced. That is, a technical problem to be solved in the present invention is to provide an iron-based oxide magnetic particle powder, which has a narrow particle size distribution, in particular, has a low content of fine particles which correspond to the lower Hc component as mentioned above, and as a result, which has a narrow coercive force distribution and is suitable for increasing recording density of a magnetic recording medium, and to provide a method for producing the iron-based oxide magnetic particle powder.

Solution to Problem

As described above, as a method for producing an iron oxyhydroxide (including a partially substituted product) which is a precursor of $\epsilon$-Fe$_2$O$_3$ or an $\epsilon$-type iron-based oxide obtained by partially substituting Fe therein, PTL 1 to 3 disclose a method by using an organic solvent and a method by using only water as the reaction solvent. However, from the economic viewpoint, it is preferred that the precursor is synthesized in an aqueous solution system without using an expensive organic solvent. When iron oxide or iron oxyhydroxide is synthesized in an aqueous solution using $Fe^{3+}$ ions as a starting material, as described in, for example, "*Kyochinhou niyoru Schwertmannite to Kakusyu In-ion Chikantai no Gousei—FeOOH Koubutsu no Seisei niokeru In-ion no Yakuwari*—(Synthesis of Schwertmannite and Various Anions-substituted Product by Coprecipitation Method—Role of Anions in Production of FeOOH Mineral)", INOUE Atsuyuki, HATTA Tamao, *Nendo Kagaku* (Journal of the Clay Science Society of Japan), vol. 45, no. 4, 250-265 (2006), the crystal system is known to vary depending on the coexisting anion species.

In a method for producing $\varepsilon$-$Fe_2O_3$ or an $\varepsilon$-type iron-based oxide obtained by partially substituting Fe therein, coating iron oxyhydroxide (including a partially substituted product) as a precursor with a silica before a heat treatment is carried out for producing a thermodynamically unstable phase by putting the precursor into a certain constrained state and thus inhibiting free deformation of the crystal lattice in the heat treatment. Accordingly, the finally obtained crystal structure of the $\varepsilon$-$Fe_2O_3$ particles is considered to be affected by the crystal structure of the precursor particles.

As a result of studies by the present inventors based on the idea above, it has been found that in production of the precursor, once a hydroxide colloid state of $Fe^{3+}$ is passed, the particle size distribution of the precursor particles becomes narrower and that the effect thereof is increased by the presence of a hydroxycarboxylic acid which stabilizes the hydroxide colloid. Moreover, it has also been found that when an iron oxyhydroxide or a product obtained by partially substituting the Fe element therein having the same crystal structure as of ferrihydrite ($Fe_5O_7(OH) \cdot 4H_2O$) is contained as a precursor, the coercive force distribution of the finally obtained iron-based oxide magnetic particle powder becomes narrower.

Based on the above findings, the present inventors have completed the present invention described below.

Incidentally, the composition of ferrihydrite shown in the above parentheses is an ideal one, and ferrihydrite actually has a certain degree of variation in the composition.

For solving the above problems, the present invention provides an iron-based oxide magnetic particle powder in which a part of Fe sites of $\varepsilon$-$Fe_2O_3$ is substituted with another metal element, having a mean particle diameter as measured by a transmission electron microscopy of 10 nm to 30 nm, wherein the value of $I_L/I_H$ calculated with $I_L$ and $I_H$ according to the following definition is 0.7 or less, and preferably 0.53 or less.

As used herein, $I_H$ is the intensity of a peak appearing on the higher magnetic field side in a differential B-H curve obtained by numerically differentiating a B-H curve obtained by a measurement under conditions of an applied magnetic field of 1035 kA/m (13 kOe), an M measurement range of 0.005 A·m² (5 emu), a step bit of 80 bit, a time constant of 0.03 sec, and a wait time of 0.1 sec. $I_L$ is the intensity of the intercept on the vertical axis at the zero magnetic field in the above differential B-H curve.

The iron-based oxide is preferably $\varepsilon$-$A_xB_yC_zFe_{2-x-y-z}O_3$ (wherein, A represents at least one divalent metal element selected from Co, Ni, Mn, and Zn, B represents at least one tetravalent metal element selected from Ti and Sn, C represents at least one trivalent metal element selected from In, Ga, and Al, and $0<x$, y, $z<1$ are satisfied).

The iron-based oxide may be $\varepsilon$-$B_yC_zFe_{2-y-z}O_3$ (wherein, B represents at least one tetravalent metal element selected from Ti and Sn, C represents at least one trivalent metal element selected from In, Ga, and Al, and $0<y$, $z<1$ are satisfied).

The iron-based oxide may be $\varepsilon$-$C_zFe_{2-z}O_3$ (wherein, C represents at least one trivalent metal element selected from In, Ga, and Al, and $0<z<1$ are satisfied).

In the iron-based oxides, $0 \leq x$, $y \leq 0.2$ and $0.15 \leq z \leq 0.60$ are more preferably satisfied. Here, in cases where both of x and y are 0, the formula means a monoelement substitution type in which one metal element substitutes Fe sites, in cases where only x is 0, the formula means a dielement substitution type, and in cases where each of x, y and z is not 0, the formula means a trielement substitution type.

The present invention also provides a method for producing an iron-based oxide in which a part of Fe sites of $\varepsilon$-$Fe_2O_3$ is substituted with another metal element, having a mean particle diameter as measured by a transmission electron microscopy of 10 nm to 30 nm, preferably an iron-based oxide magnetic particle powder having the value of described above of 0.7 or less, and preferably 0.53 or less, wherein the method comprising: using as a starting material an aqueous solution containing trivalent iron ions and ions of the metal for partially substituting Fe sites, adding an alkali to the aqueous solution to neutralize the aqueous solution to a pH of 1.5 to 2.5; then adding one or two of hydroxycarboxylic acids, preferably tartaric acid, citric acid, and malic acid to the aqueous solution; further adding an alkali to neutralize the aqueous solution to a pH of 8.0 to 9.0; washing with water a precipitate of an iron oxyhydroxide containing the substituting metal element produced; and then coating the iron oxyhydroxide containing the substituting metal element with a silicon oxide and heating the resultant, thereby obtaining an iron oxide containing the substituting metal element coated with the silicon oxide.

The present invention also provides a production method in which a hydrothermal treatment at a temperature of 120° C. to 180° C. is applied to the substituting metal element-containing iron oxyhydroxide after the water washing.

When the substituting metal element-containing iron oxide obtained by the above production method is classified after removing the coating silicon oxide, the particle size distribution and the coercive force distribution are narrower, and therefore magnetic recording characteristics of the obtained iron-based oxide magnetic particle powder are enhanced more.

The iron-based oxide magnetic particle powder produced by the present invention may comprise, as magnetic particles, $\varepsilon$-$A_xB_yC_zFe_{2-x-y-z}O_3$ (wherein, A represents at least one divalent metal element selected from Co, Ni, Mn, and Zn, B represents at least one tetravalent metal element selected from Ti and Sn, C represents at least one trivalent metal element selected from In, Ga, and Al, and $0<x$, y, $z<1$ are satisfied or $0 \leq x \leq 0.04$, $0 \leq y \leq 0.10$, and $0.15 \leq z \leq 0.60$ are satisfied).

Advantageous Effect of Invention

By using the production method of the present invention, it is possible to obtain an iron-based oxide magnetic particle powder which has a narrow particle size distribution, in particular has a low content of fine particles which do not contribute to enhancing magnetic recording characteristics, and as a result, which has a narrow coercive force distribution and is suitable for increasing recording density of a magnetic recording medium.

DESCRIPTION OF EMBODIMENTS

[Iron-Based Oxide Magnetic Particles]

The production method of the invention is a method for producing an iron-based oxide magnetic particle powder in which Fe sites of $\varepsilon$-$Fe_2O_3$ are partially substituted with other metal elements, and include a case where a different phase inevitable in the production exists in addition to the magnetic particles.

It is possible to confirm whether a partially substitution product in which the Fe sites of $\varepsilon$-$Fe_2O_3$ are partially substituted with other metal elements has the $\varepsilon$ structure or not by using X-ray diffractometry (XRD) or High Energy Electron Diffractometry (HEED).

As the partially substituted product which can be produced by the production method of the invention, the following are exemplified.

One represented by the general formula $\varepsilon$-$C_zFe_{2-x}O_3$ (wherein C represents at least one trivalent metal elements selected from In, Ga, and Al).

One represented by the general formula $\varepsilon$-$A_xB_yFe_{2-x-y}O_3$ (wherein, A represents one or more divalent metal elements selected from Co, Ni, Mn, and Zn, and B represents one or more tetravalent metal elements selected from Ti and Sn).

One represented by the general formula $\varepsilon$-$A_xC_zFe_{2-x-z}O_3$ (wherein, A represents one or more divalent metal elements selected from Co, Ni, Mn, and Zn, and C represents at least one trivalent metal elements selected from In, Ga, and Al).

One represented by the general formula $\varepsilon$-$B_yC_zFe_{2-y-z}O_3$ (wherein, B represents one or more tetravalent metal elements selected from Ti and Sn, and C represents at least one trivalent metal elements selected from In, Ga, and Al).

One represented by the general formula $\varepsilon$-$A_xB_yC_zFe_{2-x-y-z}O_3$ (wherein, A represents one or more divalent metal elements selected from Co, Ni, Mn, and Zn, B represents one or more tetravalent metal elements selected from Ti and Sn, and C represents at least one trivalent metal elements selected from In, Ga, and Al).

Here, the type of being substituted with only the element C has advantages that the coercive force of the magnetic particles can be arbitrarily controlled and in addition, the same space group as in $\varepsilon$-$Fe_2O_3$ is easily obtained. The type is however a little poor in thermal stability and therefore it is preferred to be simultaneously substituted with the element A or the element B.

The type of being substituted with two elements of A and B is superior in thermal stability and can maintain high coercive force of magnetic particles at normal temperature, but it is a little difficult to obtain a single phase of the same space group as in $\varepsilon$-$Fe_2O_3$.

The type of being substituted with three elements of A, B and C has a good balance in the characteristics mentioned above, and is superior in heat resistance, easiness of obtaining a single phase, and control of coercive force. The production method of the invention can be applied to any substitution types of iron-based oxide magnetic particles as described above.

In the case of being substituted with only the element C, the value satisfying $0<z<1$ may be adopted, but in view of writing capacity of the existing and impending magnetic head, the coercive force is required to be controlled and therefore the z value preferably satisfies $0.15 \leq z \leq 0.60$.

In the case of being substituted with the element A or B along with the element C, although the mechanism is currently unclear, simultaneous substitution by the element B is preferred because of a lower $I_L/I_H$ value. In this case, the values satisfying $0<y$, $z<1$ may be adopted, but the z value preferably satisfies $0.15 \leq z \leq 0.60$ for the same reason as above, and y preferably satisfies $0<y$ 0.1 for maintaining a high saturation magnetization $\delta s$, and more preferably satisfies $0.001 \leq y \leq 0.1$.

Moreover, the trielement-substituted product in which the element A is added along with the element C and the element B is preferred, since by adding the element A to the extent that does not deteriorate $I_L/I_H$, it is possible to more improve the saturation magnetization $\delta s$.

Suitable ranges of the substitution quantities x, y and z in a trielement-substituted product are as follows.

Although x and y may be in any ranges satisfying $0<x$, $y<1$, since the coercive force of the trielement-substituted magnetic particles is required to be varied in some extent from that of the non-substituted $\varepsilon$-$Fe_2O_3$ in view of the use for magnetic recording, x and y preferably satisfy $0.01 \leq x$, $y \leq 0.2$. The z value is also needed only to fall in the range of $0<z<1$ as with x and y, but from the viewpoint of coercive force control and easiness of obtaining single phase, z preferably falls in the range of $0<z \leq 0.5$.

The magnetic particles in which the Fe sites are partially substituted obtained by the production method of the invention can maintain high coercive force at normal temperature by appropriately adjusting the values of y or x and y, and the coercive force can be controlled to a desired value by further adjusting x, y and z.

[Mean Particle Diameter]

The magnetic particles obtained by the production method of the invention are preferably fine particles to the extent that allows each particle to have a single magnetic domain structure. The mean particle diameter as measured by a transmission electron microscopy is preferably 30 nm or less, and more preferably 20 nm or less. However, when the mean particle diameter is excessively small, the abundance ratio of the fine particles that do not contribute to enhancing the magnetic characteristics as mentioned above is increased, and magnetic characteristics per unit weight of the magnetic particle powder are deteriorated. Accordingly, the mean particle diameter is preferably 10 nm or more.

[Starting Material and Precursor]

In the production method of the invention, an acidic aqueous solution containing trivalent iron ions and metal ions of metal elements for finally substituting Fe sites (hereinafter, referred to as raw material solution) is used as a starting material for an iron-based oxide magnetic particle powder. As a supply source of the iron ions or the metal ions of the substituting elements, in terms of availability and cost, a water soluble inorganic acid salt such as a nitrate, sulfate, and chloride is preferably used. When such metal salts are dissolved in water, metal ions become dissociated and the aqueous solution shows acidity. When an alkali is added to the acidic aqueous solution containing the metal ions to neutralize the solution, a mixture of iron oxyhydroxide and hydroxides of the substituting elements, or an iron oxyhydroxide in which Fe sites are partially substituted with other metal elements is obtained. In the production method of the invention, the mixture of iron oxyhydroxide and the hydroxides of the substituting elements is used as a precursor of an iron-based oxide magnetic particle powder.

The concentration of the total metal ions in the raw material solution is not particularly defined in the present invention, but preferably 0.01 mol/L to 0.5 mol/L. A concentration less than 0.01 mol/L is not preferred in terms of economy since the amount of the iron-based oxide magnetic particle powder obtained in one reaction is then lower. A concentration of the total metal ions exceeding 0.5 mol/L is not preferred since the reaction solution is then liable to gelation due to rapid generation of precipitation of hydroxides.

In general, it is found that a crystal structure of iron oxyhydroxide generated by a liquid phase method varies depending on the anion species coexisting in the aqueous solution and the neutralization conditions. According to studies of the present inventors, it was found that when an iron oxyhydroxide having a ferrihydrite structure is contained as the iron oxyhydroxide which is a precursor of an iron-based oxide magnetic particle powder, it is easy to finally obtain an ε-type iron-based oxide.

The reason why an ε-type iron-based oxide is easily obtained when an oxyhydroxide of the ferrihydrite structure is passed is currently unclear. It is however presumed that ferrihydrite has a structure in which layers of $O^{2-}$ and $OH^-$ constituting the hexagonal closest packing arrangement and the cubic closest packing arrangement are randomly stacked and in which a part of the Fe octahedron is lost to give many voids, and that when ferrihydrite is subjected to a heat treatment under a constrained condition after being coated with a silicon oxide, the ferrihydrite is easily varied into an ε-type iron-based oxide. Moreover, also in the case where other metal elements than Fe are added for substituting a part of the Fe sites of ε-$Fe_2O_3$ with the other elements, coprecipitation with Fe is likely to occur and a different phase other than ferrihydrite is not likely to be produced, and therefore this case is presumed to be preferred also from the viewpoints of composition homogeneity and particle homogeneity.

Ferrihydrite has two structures called 6 Line (6L) and 2 Line (2L), a ferrihydrite having the 2L structure is more likely to change to the ε-type iron-based oxide than one having the 6L structure.

[First Neutralization Step]

In the production method of the invention, an alkali is added to the raw material solution to neutralize the solution to a pH of 1.5 to 2.5. The alkali used for the neutralization may be any of a hydroxide of an alkali metal or an alkali earth metal, an aqueous ammonia, and an ammonium salt such as ammonium hydrogen carbonate, but an aqueous ammonia or ammonium hydrogen carbonate is preferably used, with which impurities are not likely to remain when the ε-type iron-based oxide is finally produced by a heat treatment. The alkali may be added to the aqueous solution of the starting material in a solid form, but from the viewpoint of ensuring the reaction homogeneity, the alkali is preferably added in a form of an aqueous solution.

Since precipitation of a trivalent iron hydroxide is generated when an alkali is added to the raw material solution to raise the pH to the above range, the reaction solution during the neutralization treatment is stirred by a known mechanical means. Since the precipitation generation is in a kind of overshoot state, the precipitation is deflocculated when the pH is maintained with stirring the reaction solution and the reaction solution becomes clear. The time required for maintaining the pH varies depending on the metal ion concentration in the raw material solution and the rate of the alkali addition, but the pH is maintained until the reaction solution becomes clear. In this state, a part of the iron in the reaction solution forms hydroxide colloid, and the remaining is dissolved as soluble iron ions, the iron hydroxide colloid is presumed to act as nucleuses for producing the precursor in a second neutralization step.

In the production method of the invention, an iron-based oxide magnetic particle powder having narrow mean particle diameter distribution can be obtained due to better dispersibility of the iron hydroxide colloid produced in this step than that of the hydroxide precipitation before deflocculation.

In this step, the pH after the neutralization less than 1.5 is not preferred, since the iron hydroxide colloid is then further dissolved as soluble iron ions. The pH after the neutralization exceeding 2.5 is also not preferred, since the precipitation of iron hydroxide is then liable to remain.

In the production method of the invention, the reaction temperature during the neutralization treatment is not particularly defined, but is preferably 0° C. to 60° C. A reaction temperature lower than 0° C. is not preferred since the time required for re-dissolving the hydroxide precipitation is then longer. A temperature exceeding 60° C. is not preferred since ferrihydrite 6L is then formed to easily produce a different phase (a phase). The temperature is more preferably 10° C. to 40° C.

The pH value as described herein was measured using glass electrodes based on JIS 28802. A pH standard solution means a value measured by a pH meter which is corrected using an appropriate buffer solution corresponding to the pH region to be measured. In addition, the pH described herein is a direct read of a measurement value under a reaction temperature condition indicated by a pH meter compensated by a temperature compensating electrode.

[Hydroxycarboxylic Acid Addition Step]

In the production method of the invention, a hydroxycarboxylic acid is subsequently added to the reaction solution described above that is brought clear by maintaining the neutralized raw material solution. Hydroxycarboxylic acid is a carboxylic acid having an OH group in the molecule and acts as a complexing agent for an iron ion. Here, it is considered that the hydroxycarboxylic acid forms a complex with trivalent iron ions dissolved in the reaction solution, delays an iron hydroxide forming reaction during a second neutralization treatment in the next step, and as a result, has an effect of narrowing the distribution of the mean particle diameter of the iron oxyhydroxide precursor fine particles produced.

As the hydroxycarboxylic acid, there are various kinds such as glycolic acid, lactic acid, various types of hydroxylactic acid, glyceric acid, malic acid, tartaric acid, citric acid, and mevalonic acid, but from the viewpoint of complexing capability, a polyvalent aliphatic hydroxycarboxylic acid is preferred, and in terms of cost and availability, tartaric acid, citric acid, or malic acid is more preferred.

The amount of the hydroxycarboxylic acid added is preferably 0.01 to 0.5 in terms of the molar ratio relative to the amount of the trivalent iron ions contained in the reaction solution. A molar ratio less than 0.01 is not preferred since the effect of addition of the hydroxycarboxylic acid is then not obtained, and a molar ratio exceeding 0.5 is not preferred since the effect of delaying the hydroxide forming reaction mentioned above is then excessively high. In addition, it is presumed that the hydroxycarboxylic acid is adsorbed on surfaces of iron hydroxide colloid in the reaction solution, and has an action of stabilizing dispersion of the hydroxide colloid.

The hydroxycarboxylic acid may be added in a state under mechanical stirring without particularly changing the reaction temperature in the first neutralization step which is a previous step. The hydroxycarboxylic acid may be added in a solid form to the reaction solution, but from the viewpoint of ensuring reaction homogeneity, is preferably added in a form of aqueous solution.

[Second Neutralization Step]

In the production method of the invention, an alkali is further added to the reaction solution after addition of the hydroxycarboxylic acid to neutralize the solution to a pH of 8.0 to 9.0. The alkali to be added is the same as in the first neutralization step. By this step, the nucleuses of the iron oxyhydroxide produced in the first neutralization step which is a precursor of an ε-type iron-based oxide are grown to produce final precursor crystals.

It is considered that in this step, by adding an alkali, the trivalent iron ions present in the reaction solution react with OH⁻ ions to produce iron oxyhydroxide, and since in this time the iron hydroxide colloid which has a good dispersibility is used as nucleuses for precipitation, non-uniform growth of an iron oxyhydroxide containing substituting elements depending on the reaction site does not occur, and a precursor having narrower distribution of mean particle diameter can be obtained. In addition, it is presumed that since the trivalent iron ions present in the reaction solution have formed a complex with the hydroxycarboxylic acid, the reaction between trivalent iron ions and OH⁻ ions moderately occurs, and therefore non-uniform growth in terms of size is less likely to occur also among the individual fine particles of the substituting elements-containing iron oxyhydroxide which are growing in a crystal form.

The reason why according to the production process of the present invention, ferrihydrite is likely to be produced as a substituting elements-containing iron oxyhydroxide which is a precursor is currently unclear, but it is considered that both the fact that the iron hydroxide colloid is used as nucleuses for production and the fact that a reaction of substituting a hydroxycarboxylic acid coordinating to trivalent iron ions with an OH⁻ ion is passed contribute thereto.

In this step, a pH after the neutralization less than 7.5 is not preferred, since Co that is not completely neutralized in the first neutralization step then remains in the ion form in the solution to cause variation in the composition, and such a pH is not preferred also in terms of economy since Co go then to waste. A pH after the neutralization exceeding 9.0 is not preferred, since the effect of the neutralization is saturated.

The reaction temperature during the neutralization treatment in this step is also not particularly defined, but preferably 0° C. to 60° C. A reaction temperature less than 0° C. is not preferred since such a condition is industrially stringent. A temperature exceeding 60° C. is not preferred since ferrihydrite 6L is likely to be produced. The temperature is more preferably 10° C. to 40° C.

The reaction conditions are preferably controlled so that the reaction time is 60 minutes to 480 minutes in view of the balance between the iron oxyhydroxide growing rate and economy.

[Water Washing Step]

In the production method of the invention, the iron oxyhydroxide as a precursor produced until the previous step mentioned above is not preferred since it will become an aggregated system as the hydroxycarboxylic acid addition step and the second neutralization step are passed due to increased ion intensity in the solution. For this reason, a slurry obtained from the above step is washed with water to decrease the ion intensity in the solution and bring the slurry into a dispersed state again. A method for water washing is not particularly defined, but preferred is a method in which the slurry is subjected to a water washing treatment as it is in a slurry state, in view of maintaining particle dispersibility in this step, uniform washing, compatibility with the prior and subsequent steps, and handleability. When the above factors are taken into consideration, water washing with an ultrafiltration membrane or an ion exchanging membrane is preferred. In the case of washing by an ultrafiltration membrane, a membrane having a molecular cutoff in which the particles do not pass into the filtrate side is used and the washing is preferably continued until an electrical conductivity of the filtrate becomes 50 mS/m or less, and more preferably 10 mS/m or less. When a significant amount of ions remain, there is a problem that a different phase is liable to be produced.

As the molar ratio of the hydroxycarboxylic acid relative to the amount of the trivalent iron ions mentioned above is increased, the dispersion state of the slurry tends to be improved.

[Hydrothermal Treatment Step]

In the production method of the invention, a hydrothermal treatment may be applied to the substituting elements-containing iron oxyhydroxide after water washing. When a hydrothermal treatment is applied, the $I_L/I_H$ value and switching field distribution (SFD) described later of the finally-obtained iron-based oxide magnetic particle powder are reduced and improved. This is presumably because in the hydrothermal treatment, a phenomenon similar to the Ostwald ripening, that is, a phenomenon of dissolution and re-precipitation of the substituting elements-containing iron oxyhydroxide crystals occurs, and the crystallinity of the precursor is improved and in addition, the composition is homogenized.

The hydrothermal treatment is conducted at a temperature of 120° C. to 180° C. using a sealed container such as an autoclave. A hydrothermal treatment temperature less than 120° C. is not preferred since the effect of the treatment is then lower and a temperature exceeding 180° C. is also not preferred since a precursor that does not result in the ε-type iron oxide is then produced. A solution for use in the hydrothermal treatment may be prepared with the slurry after the water washing as it is without nothing added, and pure water, but an aqueous solution in which a pH at normal temperature is adjusted to 9 or less by adding an alkali may be used. In the production method of the invention, the time for the hydrothermal treatment is not particularly defined, but a treatment for 1.0 to 6.0 hours can provide a sufficient effect.

[Coating Step with Silicone Oxide]

In the production method of the invention, the iron oxyhydroxide containing substituting elements as a precursor, produced until the previous step mentioned above is not liable to be varied in phase into an ε-type iron-based oxide even when a heat treatment is applied to the iron oxyhydroxide as it is, and therefore before a heat treatment, a silicon oxide coating is applied on the substituting elements-containing iron oxyhydroxide crystals. As a method of coating with a silicon oxide, a sol-gel method is preferably applied. Incidentally, as used herein, the silicon oxide includes not only one having a stoichiometric composition but also one having non-stoichiometric composition such as a silanol derivative described later.

In the case of a sol-gel method, a silicon compound having a hydrolyzable group, such as tetraethoxy silane (TEOS) and tetramethoxy silane (TMOS), or a silane compound such as various silane coupling agents is added to the aqueous solution of the substituting elements-containing iron oxyhydroxide crystals dispersed through water washing to cause a hydrolysis reaction under stirring, and the surfaces of the iron oxyhydroxide crystals are coated with a thus-produced silanol derivative. Also, an acid catalyst or an alkali catalyst may be added. This addition is preferred in view of the treatment time. One typical example of the acid catalyst is hydrochloric acid and one typical example of an alkali catalyst is ammonia. When an acid catalyst is used, the addition amount has to be suppressed so that the substituting elements-containing iron oxyhydroxide particles are not dissolved. Alternatively, an inorganic silicon compound, sodium silicate (water glass) can be used.

Incidentally, a specific procedure for coating with the silicon oxide may be the same as in a sol-gel method of known processes. For example, the reaction temperature in silicon oxide coating by a sol-gel method is 20° C. to 60° C., and the reaction time is approximately from 1 hour to 20 hours. After the coating treatment with a silicon oxide, solid-liquid separation and a drying treatment are performed to obtain a sample before a heating step. Here, in the solid-liquid separation, a flocculant may be added to separate solid and liquid.

[Heating Step]

In the production method of the invention, the above-mentioned substituting elements-containing iron oxyhydroxide as a precursor coated with a silicon oxide is subjected to a heating treatment to obtain an ε-type iron-based oxide. Steps of washing and drying may be provided before the heating treatment. The heating treatment is performed in an oxidizing atmosphere, and as the oxidizing atmosphere, an air atmosphere may be used. The heating may be performed at a temperature in the range approximately from 700° C. to 1300° C. When the heating temperature is higher, however, $\alpha$-$Fe_2O_3$ which is a thermodynamically stable phase (this is an impurity viewed from ε-$Fe_2O_3$) is more likely to be produced, and therefore the heating treatment is preferably performed at a temperature of 900° C. to 1200° C., and more preferably 950° C. to 1150° C. The time for the heat treatment can be adjusted in the range approximately from 0.5 hours to 10 hours, but in the range of 2 hours to 5 hours, a satisfactory result is easily obtained. Incidentally, it is considered that the existence of the silicon-containing substance coating the particles advantageously functions for causing phase change not to the α-type iron-based oxide but to the ε-type iron-based oxide. In addition, the silicon oxide coating has an action for preventing sintering between crystals of the substituting elements-containing iron oxyhydroxide in the heating treatment.

Through the steps described above, in the case where the raw material solution contains as metal ions trivalent iron ions and metal elements for substituting the iron sites, partially-substituted ε-$Fe_2O_3$ crystals can be obtained in a state where the crystals are coated with a silicon oxide. In the powder obtained after the heating treatment, besides the ε-type iron-based oxide crystals, an α-type iron-based oxide, a γ-type iron-based oxide, and $Fe_3O_4$ crystals sometimes exist as impurities, but the powder including the impurities is referred to as an iron-based oxide magnetic particle powder.

The iron-based oxide magnetic particle powder obtained by the production method of the invention may be used in a state of being coated with a silicon oxide, but depending on the use purposes, the powder may be used after the silicon oxide coating covering the surfaces is removed by a step as described below.

[Silicon Oxide Coating Removal Step]

When the iron-based oxide magnetic particle powder is not required to be coated with a silicon oxide, or when the iron-based oxide magnetic particle powder is subjected to classification for enhancing the magnetic recording characteristics thereof, the silicon oxide coating the ε-$Fe_2O_3$ crystals is removed before such a process. In use for a coating type magnetic recording medium, since the magnetic particles applied on a tape are required to be subjected to a magnetic field orientation treatment and since in the state of being coated with a silicon oxide, the amount of the silicon oxide which is a non-magnetic component is increased to decrease the magnetization amount per unit area of the tape (the signal from the tape is weaken), the coating silicon oxide is preferably removed by a step as described below. As a specific method, since silicon oxide is soluble in an alkaline aqueous solution, the silicon oxide can be dissolved and removed by immersing the powder after the heating treatment in an aqueous solution having a strong alkali such as NaOH or KOH dissolved therein and stirring the mixture. For increasing the dissolving rate, the aqueous alkali solution may be mildly heated. Typically, when an alkali such as NaOH is added in an amount of three times or more in molar ratio relative to the silicon oxide and the powder is stirred under an aqueous solution temperature of 60° C. to 70° C., the silicon oxide can be dissolved well. The degree of removing the silicon oxide coating is appropriately adjusted depending on the purpose.

After the removal, for securing good dispersibility in the next step, unwanted ions are required to be removed by water washing until the electrical conductivity of the filtrate becomes 50 mS/m or less.

[Classification Step]

In the production method of the invention, an iron-based oxide magnetic particle powder suitable for use in a coating type magnetic recording medium can be obtained without a classification step, but when an classification treatment is performed, an iron-based oxide magnetic particle powder suitable for increased recording density can be obtained. When a transmission electron microscopy (TEM) photograph of a particle obtained through a process without classification is observed, there exist, although in a minute amount, particles that do not contribute to the magnetic recording, such as fine particles that are considered to have poor environmental stability (thermal stability) and weak magnetization, and coarse particles that are considered to have a coercive force higher than a saturation magnetic flux density of a magnetic head.

As a specific method, a dispersing treatment is first performed. Since a slurry obtained after the silicon oxide coating removal step is in an aggregated system, classification efficiency is poor in the case where the slurry is classified as it is, and coarse particles are removed together with fine particles and fine particles are treated together with coarse particles. In addition, the yield is low which is not economically advantageous. The dispersing treatment method is a treatment method by combining a pH adjustment and a disperser, and by adding an alkali to adjust the pH of the dispersion to 10 to 11 and then performing a dispersing treatment with an ultrasonic disperser and the like, a turbid aggregated slurry is changed to a clear dispersion slurry.

Next, the dispersion slurry was subjected to a known classification treatment. In the case of classification by centrifugation, the target classification degree is controlled by the rotation rate, the time, and the like to remove the particles that do not contribute to magnetic recording.

The thus-obtained iron-based oxide magnetic particle powder has an increased abundance ratio of the particles that contribute to magnetic recording, and is an iron-based oxide magnetic particle powder suitable for increased recording density.

[Transmission Electron Microscopy (TEM) Observation]

The TEM observation of an iron-based oxide magnetic particle powder obtained by the production method of the invention was conducted under the following conditions.

For the TEM observation, JEM-1011 manufactured by JOEL, Ltd. was used. For particle observation, a particle was imaged at a magnification of 10,000 or a magnification of 100,000, then the photograph was enlarged three times on developing, and the resulting TEM photograph was used (A particle after removing a silicon oxide coating was used).

For evaluating the mean particle diameter and the particle size distribution (coefficient of variation (%)), digitization was used and a distance between the two points spaced apart the most on a particle was measured. The number of particles measured was 300 or more.

[Measurement of X-Ray Diffraction (XRD) Pattern]

The obtained sample was subjected to powder X-ray diffraction (XRD: RINT 2000 manufactured by Rigaku Corporation, radiation source: CoKα ray, voltage: 40 kV, current: 30 mA, 2θ=10°-80°. According to the measurement, the precursor phase, the ε-phase production, and the different phase were confirmed.

[Composition Analysis by High Frequency Inductively Coupled Plasma Atomic Emission Spectrophotometry (ICP)]

Composition analysis was conducted using ICP-720ES manufactured by Agilent Technologies. The measurement wavelengths (nm) were 259.940 nm for Fe, 294.363 nm for Ga, 230.786 nm for Co, 336.122 nm for Ti, and 288.158 nm for Si.

[Measurement of Magnetic Hysteresis Loop (B-H Curve)]

Magnetic characteristics were measured using a vibrating sample magnetometer (VSM) (VSM-5 manufactured by Toei Industry Co. Ltd.) under the conditions of an applied magnetic field of 1035 kA/m (13 kOe), a M measurement range of 0.005 A·m$^2$ (5 emu), a step bit of 80 bit, a time constant of 0.03 sec, and await time of 0.1 sec. From the B-H curve, the coercive force Hc, the saturation magnetization δs, and the SFD were evaluated, and from the differential B-H curve, a lower Hc component that does not contribute to magnetic recording was evaluated. A software (Ver. 2.1) supplied by Toei Industry Co., Ltd. was used for the measurements and the evaluations.

Figure 3:
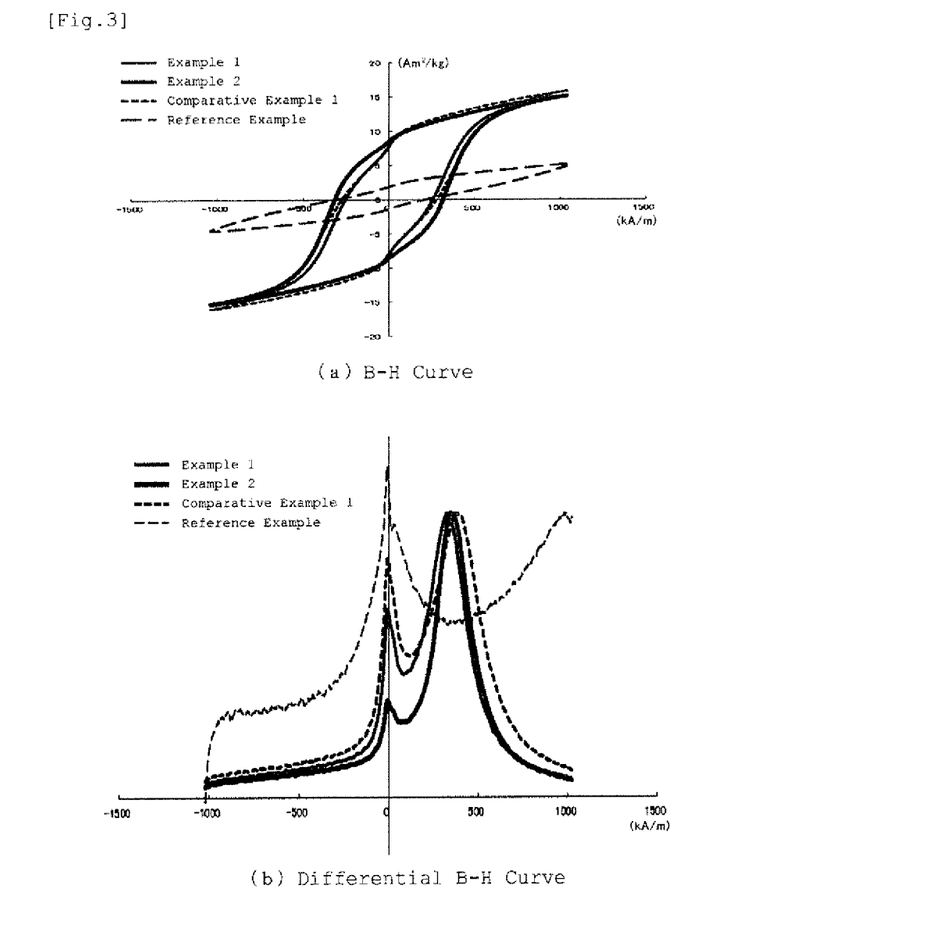
FIG. 3 shows (a) B-H curves and (b) differential B-H curves for iron-based oxide magnetic particle powders obtained in Example 1, Example 2, Comparative Example 1, and Reference Example 1.

The differential B-H curve described above was calculated herein besides common magnetic characteristics to analyze magnetic characteristics of an iron-based oxide magnetic particle powder obtained in more detail. The specific analysis method is described below (see FIG. 3 shown later).

When a B-H curve is measured for an iron-based oxide magnetic particle powder containing a partially substituted ε-Fe$_2$O$_3$ produced by the liquid phase method, as the external magnetic field is increased after completion of demagnetization, a small shoulder (depression) appears in the increasing curve of the magnetic flux density in the vicinity of the zero magnetic fields. Accordingly, two peaks are observed in a differential B-H curve obtained by numerically differentiating the B-H curve. This means that the B-H curve measured for the iron-based oxide magnetic particle powder is a curve in which two B-H curves having different coercivities Hc are combined and that the iron-based oxide magnetic particle powder contains two different components having different magnetic characteristics.

Here, a component of the lower Hc side is a component that does not contribute to increasing recording density when the iron-based oxide magnetic particle powder is used for a magnetic recording medium. When the abundance ratio of very finer particles relative to the mean particle diameter contained in an iron-based oxide magnetic particle powder is reduced by means of variation in production conditions, classification, and the like, reduction is observed in the height of the lower Hc-side peak in the differential B-H curve, and thus it can be seen that the finer particles are the lower Hc component.

Assuming now that an iron-based oxide magnetic particle powder is used in a magnetic recording medium, when the intercept on the vertical axis at the zero magnetic field in a differential B-H curve is taken as $I_L$, and the height of the higher Hc-side peak is taken as $I_H$, as the value of the peak heights ratio $I_L/I_H$ is lower, the amount of particles that do not contribute to magnetic recording are reduced and the recording density is increased. When the production method of the invention is used, an iron-based oxide magnetic particle powder having an $I_L/I_H$ value of 0.7 or less, preferably 0.53 or less, can be obtained.

A value obtained by dividing the half width by the Hc in the higher Hc-side peak is a value corresponding to the switching field distribution (SFD), and as the half width is decreased, the coercive force distribution of the iron-based oxide magnetic particle powder is narrowed. When the production method of the invention is used, as compared with production methods in the related art, an iron-based oxide magnetic particle powder in which the half width of the higher Hc-side peak is smaller and SFD is 1.3 or less can be obtained.

[Preparation of Magnetic Coating Material]

A sample powder (iron-based oxide magnetic particle powder) (0.31 g) was weighed, and placed in a stainless steel pot (inner diameter: 45 mm, depth: 13 mm). The pot with a lid opened was left to stand for 10 minutes. Next, 1.11 mL of a vehicle [34.9 g of a urethane resin (UR-8200 manufactured by Toyobo Co. Ltd.) and 15.8 g of a vinyl chloride resin (MR-555 manufactured by Zeon Corporation) were dissolved in a mixed solvent of 0.25 g of acetylacetone, 0.25 g of n-butyl stearate, and 97.9 mL of cyclohexane] was taken with a micropippete, and added into the pot. Then, 30 g of steel balls (2 mm diameter) and 10 nylon balls (8 mm diameter) were immediately put into the pot, and the pot with the lid closed was left to stand for 10 minutes. After that, the pot was set on a centrifugal ball mill (FRITSCH P-6), the disc rotation rate was increased to 600 rpm over 5 seconds, and then a dispersion treatment was performed at a disc rotation rate of 600 rpm for 60 minutes. After the centrifugal boll mill stopped, the pot was taken out and 0.70 mL of the prepared liquid in which MEK and toluene were previously mixed at 1:1 was added with a micropippete. The pot was set again on the centrifugal boll mill, and a dispersion treatment was performed at a disc rotation rate of 600 rpm for 5 minutes, whereby a coating material was prepared.

[Production of Magnetic Sheet]

After the dispersion was completed, the lid of the pot was opened and the nylon balls were removed. The prepared coating material was put together with the steel balls into an applicator (gap: 250 μm), and applied on a support film (a polyethylene film, trade name: Lumirror, manufactured by Toray Industries Inc.). Within 5 seconds after the application, the film was placed at the center of a coil of an orientation apparatus having a magnetic flux density of 0.55 T to be oriented in the magnetic field orientation, and the film was left to stand to be dried as it was.

[Measurement of Magnetic Hysteresis Loop (Sheet B-H Curve)]

A measurement piece of a 10-mm square in which a plastic plate was bonded in a manner that the magnetic field orientation direction of the film can be recognized and the assembly was perforated with a punch or the like was set with the orientation direction thereof matched with the direction of the applied magnetic field. Using a VSM apparatus (VSM-P7-15) manufactured by Toei Industry Co. Ltd. at an external magnetic field of 795.8 kA/m (10 kOe), the coercive force Hcx (Oe, kA/m), the coercive force distribution SFDx, the maximum energy product BHmax, the saturation magnetic flux density Bs (Gauss), and the remaining magnetic flux density Br (Gauss) were measured in the magnetic field orientation direction parallel to the magnetic layer surface to determine SQx (=Br/Bs) in the magnetic field orientation direction.

In the field of coating type magnetic recording medium, from the viewpoint of a medium suitable for a recording system, a large squareness ratio (SQx) in the magnetic field orientation direction (referred to as x direction) is demanded as a tape characteristic. The squareness ratio (SQx=Br/Bs) is a ratio of a remaining magnetic flux density Br of the tape to a saturated magnetic flux density Bs of the tape when a magnetic field is applied in the magnetic field orientation direction, and is a numerical value used as a measure of orientation. When the SQx is increased, the output power is enhanced, and therefore for producing a coating type recording medium of high performance, a magnetic powder having good dispersibility and good orientation resulting in high SQx was demanded.

Moreover, a low switching field distribution (SFD) is also preferred since the output is then increased. The same is said for SFDx.

When the iron-based oxide magnetic particle powder of the present invention is used in a coating material to produce a medium, SQx is significantly improved and in addition, SFDx is also improved, and thus a magnetic sheet (magnetic recording medium) having excellent characteristics can be obtained. In addition, HCx falls within the range of a preferred value as a magnetic recording medium.

Since the powder produced by the present production method provides a surface and the like that are similar to those in the related art, production of a recording medium can be made within the scope of methods in the related art.

EXAMPLES

Example 1

In a 30 L reaction tank, 2910.27 g of iron (III) nitrate nonahydrate of a purity of 99.5%, 786.25 g of a gallium (III) nitrate solution having a Ga concentration of 10.3%, 65.76 g of cobalt (II) nitrate hexahydrate of a purity of 97%, and 69.04 g of titanium (IV) sulfate having a Ti concentration of 15.2% were dissolved in 31368.68 g of pure water under conditions of air atmosphere and 40° C. with mechanical stirring by a stirring blade. The molar ratio of the metal ions in the charged solution, Fe:Ga:Co:Ti is 1.635:0.265:0.050:0.050. Incidentally, the numerals in the parentheses following the reagent names represent the valence of the metal element.

In air atmosphere at 40° C., with mechanical stirring by the stirring blade, 1595.91 g of a 22.09% ammonia solution was added at once and stirring was continued for 2 hours. The liquid was brown and turbid at an early stage of the addition, but came into a clear brown reaction liquid after 2 hours, and the pH was 1.67.

Next, 1684.38 g of a citric acid solution having a citric acid concentration of 10 mass % was continuously added over 1 hour under a condition of 40° C., and then 2000 g of a 10 mass % ammonia solution was added at once to make the pH into 8.51. After that, the mixture was held with stirring in the temperature condition of 40° C. for 1 hour, thereby producing crystals of a substituting elements-containing iron oxyhydroxide as a precursor which was an intermediate product (Procedure 1). Incidentally, the molar ratio of citric acid to the trivalent iron ion amount in the Example is 0.122.

Figure 1:
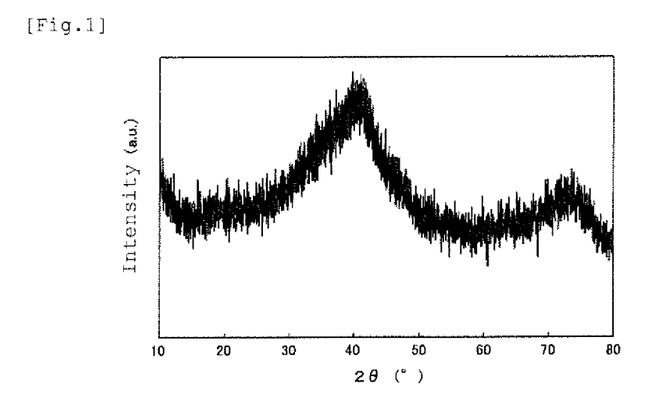
FIG. 1 shows a XRD pattern obtained with an intermediate product of Example 1.

FIG. 1 shows an X-ray diffraction pattern of the crystals of the substituting elements-containing iron oxyhydroxide obtained in the Example. The X-ray diffraction pattern shows that the iron oxyhydroxide has the ferrihydrite structure.

A slurry obtained in Procedure 1 was collected, and washed through an ultrafiltration membrane having a UF molecular cutoff of 50,000 until the electrical conductivity of the filtrate became 50 mS/m or less. The conductivity of the washed slurry was 105 mS/m. (Procedure 2).

In a 5 L reaction tank, 3162.89 g of the washed slurry liquid (containing 60 g of ε-$Fe_2O_3$ (partially substituted product)) obtained in Procedure 2 was taken, pure water was added to make the liquid volume 4000 mL, and then in the atmosphere at 30° C. with stirring, 0.8 mass % based on ε-$Fe_2O_3$ of ammonia, and 7.0 mass % based on ε-$Fe_2O_3$ of tetraethoxy silane were added. After 212.46 g of a 22.09 mass % ammonia solution is added, 428.95 g of tetraethoxy silane is added to the slurry liquid over 35 minutes. The mixture was continuously stirred for about 1 day as it was to be coated with a silanol derivative produced by hydrolysis. Then, a solution in which 202.6 g of ammonium sulfate was dissolved in 300 g of pure water was added and the obtained solution was washed and subjected to solid-liquid separation, thereby collecting a cake (Procedure 3).

After the precipitation obtained in Procedure 3 (a precursor coated with a gel $SiO_2$) was dried, the dry powder was subjected to a heat treatment in an oven under air atmosphere at 1066° C. to 1079° C. for 4 hours, thereby obtaining an iron-based oxide magnetic particle powder coated with a silicon oxide. Incidentally, the silanol derivative is changed to the oxide when being subjected to the heat treatment in air atmosphere (Procedure 4).

The heat-treated powder obtained in Procedure 4 was stirred in a 20 mass % NaOH aqueous solution at about 70° C. for 24 hours to conduct a treatment for removing the silicon oxide on particle surfaces. Next, with an ultrafiltration membrane having a UF molecular cutoff of 50,000, the powder was washed until the conductivity of the washed slurry became 1.476 mS/m and dried, and then subjected to chemical analysis of the composition, XRD measurement, TEM observation, measurement of magnetic characteristics, and the like.

The chemical composition of the obtained iron-based oxide magnetic particle powder was almost the same as the composition at the time of charging. The result of the XRD measurement was not illustrated, but the same crystal structure as in ε-Fe$_2$O$_3$ was shown.

Figure 2:
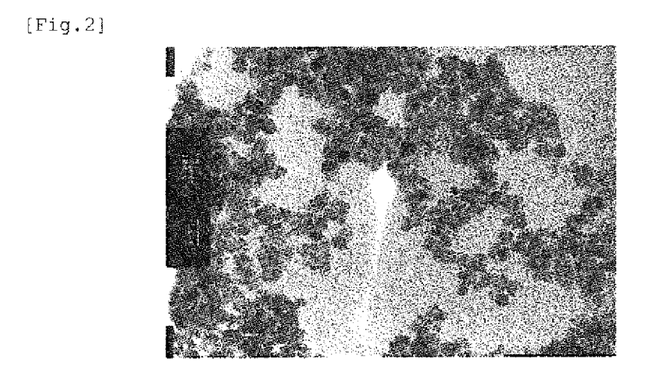
FIG. 2 is a TEM photograph of an iron-based oxide magnetic particle powder obtained in Example 1.

A TEM photograph of the iron-based oxide magnetic particle powder obtained in the Example is shown in FIG. 2 and the metal ion charging ratio and the measurement results of the mean particle diameter, etc. were collectively shown in Table 1. Incidentally, the length of the white bar shown on the left side of the TEM photograph represent 50 nm (the same is applied on TEM photographs herein below).

In FIG. 3, (a) a B-H curve and (b) a differential B-H curve for the iron-based oxide magnetic particle powder obtained in the Example were shown, and measurement results of coercive force, etc. are collectively shown in Table 1. In FIG. 3(b), normalization was performed so that the higher Hc-side peaks have the same height except for the reference example, and the vertical axis (dB/dH) represents arbitrarily intensities.

The iron-based oxide magnetic particle powder obtained in the Example had a mean particle diameter of 16.3 nm, a coefficient of variation (CV value) of 39.6%, and a number % of fine particles having a particle diameter of 8 nm or less of 9.2%. Two peaks were clearly observed in the differential B-H curve, and the ratio of the lower Hc component was 0.65, and SFD determined by the half width of the peak of the higher Hc component was 1.19. Both the values are superior to those for an iron-based oxide magnetic particle powder obtained in Comparative Example 1 described later.

Example 2

Silicon oxide coating of an iron-based oxide magnetic particle powder coated with a silicon oxide obtained by the same procedure as in Example 1 was removed by the removal method described above, and then the powder was washed with an ultrafiltration membrane having an UF molecular cutoff of 50,000 until the conductivity became 1.476 mS/m or less.

After pure water was added to the obtained magnetic powder-containing slurry and a NaOH aqueous solution was added to make the pH 11.0, an ultrasonic dispersion treatment was performed using an ultrasonic washing machine (Yamato 5510 manufactured by Branson (Yamato Scientific Co. Ltd.)) for 1 hour, and then a centrifugation treatment was applied using an R10A3 rotor of a centrifugal machine (himac 21G2 manufactured by Hitachi Koki Co. Ltd.) at 8000 rpm for 30 minutes. After the precipitation containing coarse particles was removed, the same operation was repeated twice, thereby obtaining a slurry solution in which coarse particles were removed.

Subsequently, a fine particles removal treatment from the obtained slurry solution was conducted. After pure water was added to the magnetic powder-containing slurry obtained above and a NaOH aqueous solution was added to make the pH 11.0, an ultrasonic dispersion treatment was performed using an ultrasonic homogenizer (US-600TCVP) for 2 hours, then a centrifugation treatment was applied using an R10A3 rotor of a centrifugal machine (himac 21G2) at 8000 rpm for 30 minutes and the supernatant containing fine particles was removed.

After pure water was further added to the obtained precipitation and a NaOH aqueous solution was added to make the pH 11.0, an ultrasonic dispersion treatment was performed using an ultrasonic washing machine (Yamato 5510) for 1 hour, and then a centrifugation treatment was applied using an R10A3 rotor of a centrifugal machine (himac 21G2) at 8000 rpm for 30 minutes. After the supernatant containing fine particles was removed, the same operation was conducted once more, the precipitation in which the fine particles were removed was filtered with a membrane to collect a cake, and the cake was then dried. The obtained particles were subjected to chemical analysis of composition, XRD measurement, TEM observation, and measurement of magnetic characteristics, and the like.

Figure 4:
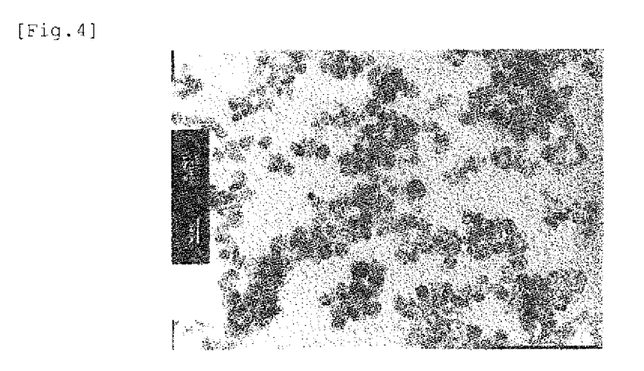
FIG. 4 is a TEM photograph of an iron-based oxide magnetic particle powder obtained in Example 2.

A TEM photograph of the iron-based oxide magnetic particle powder obtained in the Example was shown in FIG. 4, and the metal ion charging ratio and the measurement results of the mean particle diameter, etc. were collectively shown in Table 1.

In FIG. 3, a B-H curve and a differential B-H curve for the iron-based oxide magnetic particle powder obtained in the Example were shown together, and the measurement results of the coercive force, etc. were collectively shown in Table 1.

The iron-based oxide magnetic particle powder obtained by the Example had an mean particle diameter of 21.3 nm, a coefficient of variation (CV value) of 35.0%, and a number % of fine particles having a mean particle diameter of 8 nm or less of 2.2%, and thus it can be seen that fine particles were removed by classification. According to this, the ratio of the lower Hc component and the SFD determined by the half width of the peak of the higher Hc component were respectively reduced to 0.34 and 0.77, and the coercive force distribution of the iron-based oxide magnetic particle powder was narrowed.

Comparative Example 1

In a reaction tank, 3076.76 g of iron (III) nitrate nonahydrate of a purity of 99.2%, 772.47 g of a gallium (III) nitrate solution having a Ga concentration of 11.05%, 69.32 g of cobalt (II) nitrate hexahydrate of a purity of 97%, and 72.77 g of titanium (IV) sulfate having a Ti concentration of 15.2% were dissolved in 18972.98 g of pure water under conditions of air atmosphere and 30° C. with mechanical stirring by a stirring blade. The molar ratio of metal ions in the charged solution, Fe:Ga:Co:Ti is 1.635:0.265:0.050:0.050.

To the raw material solution, 2582.23 g of an aqueous ammonia having a concentration of 22.35 mass % was added under a condition of a temperature of 30° C., and in a phase where the pH was 8.0 to 9.0, the mixture was stirred for 30 minutes. In this case, neutralization was performed in one stage, and citric acid was not added. In this case, crystals having the same crystal form as ferrihydrite were precipitated as an intermediate iron oxyhydroxide. Subsequently, without water washing of the produced iron oxyhydroxide crystals, 5269.74 g of tetraethoxy silane was directly added to the reaction solution, and after the addition, the stirring was continued for about 1 day, whereby the crystal surfaces of the iron oxyhydroxide were coated with a silanol derivative produced by hydrolysis of tetraethoxy silane. The subsequent procedure is the same as in Example 1 except that the sintering temperature was 1061° C. to 1063° C. Incidentally, the procedure follows the procedure described in PTL 1.

Figure 5:
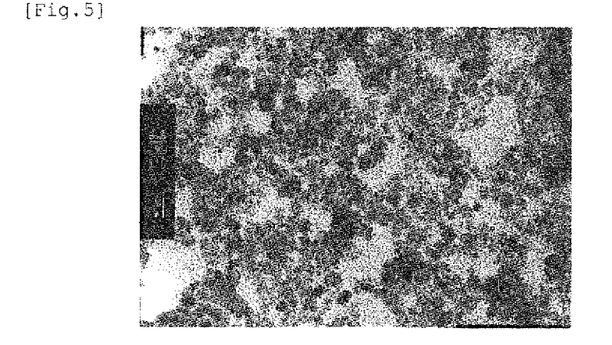
FIG. 5 is a TEM photograph of an iron-based oxide magnetic particle powder obtained in Comparative Example 1.

A TEM photograph of the iron-based oxide magnetic particle powder obtained in the Comparative Example was shown in FIG. 5, and the measurement results of the mean particle diameter, etc. were collectively shown in Table 1.

In FIG. 3, a B-H curve and a differential B-H curve for the iron-based oxide magnetic particle powder obtained in the Comparative Example were shown together, and the measurement results of the coercive force, etc. were collectively shown in Table 1.

The iron-based oxide magnetic particle powder obtained by the Comparative Example had a mean particle diameter of 16.1 nm, a coefficient of variation (CV value) of 48.4%, and a number % of fine particles having a mean particle diameter of 8 nm or less of 13.3. It can be seen that in the case of the Comparative Example in which the neutralization treatment was conducted in one stage and citric acid was not added, as compared with the Examples of the present invention, the abundance ratio of fine particles is larger.

In the case of the Comparative Example, the ratio of the lower Hc component determined from the differential B-H curve was 0.83 and does not match with the observation result of the mean particle diameter in TEM. Accordingly, it is suggested that the coercive force of the iron-based oxide magnetic particle powder obtained by the production method in the Comparative Example is not simply controlled by the mean particle diameter. In the iron-based oxide magnetic particle powder obtained in the Comparative Example, the SFD determined from the half width of the higher Hc component peak was 1.51, and the coercive force distribution was wider than that of the iron-based oxide magnetic particle powders obtained in Examples of the present invention, showing a poorer performance of magnetic recording.

Examples 3-9

Figure 7:
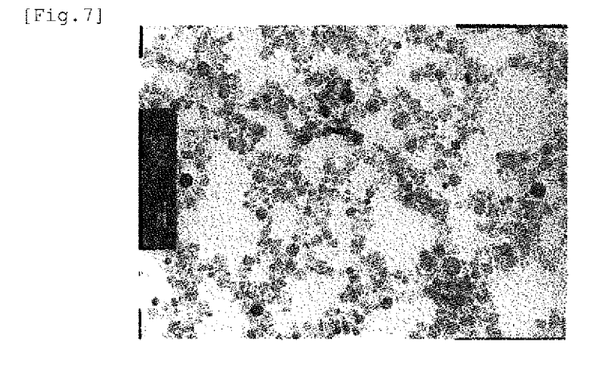
FIG. 7 is a TEM photograph of an iron-based oxide magnetic particle powder obtained in Example 3.
Figure 8:
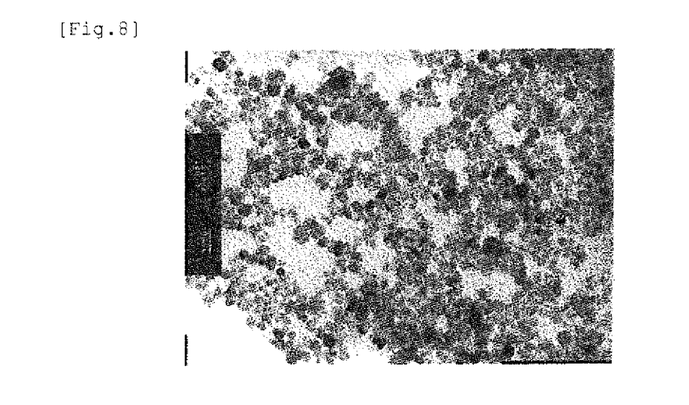
FIG. 8 is a TEM photograph of an iron-based oxide magnetic particle powder obtained in Example 5.
Figure 9:
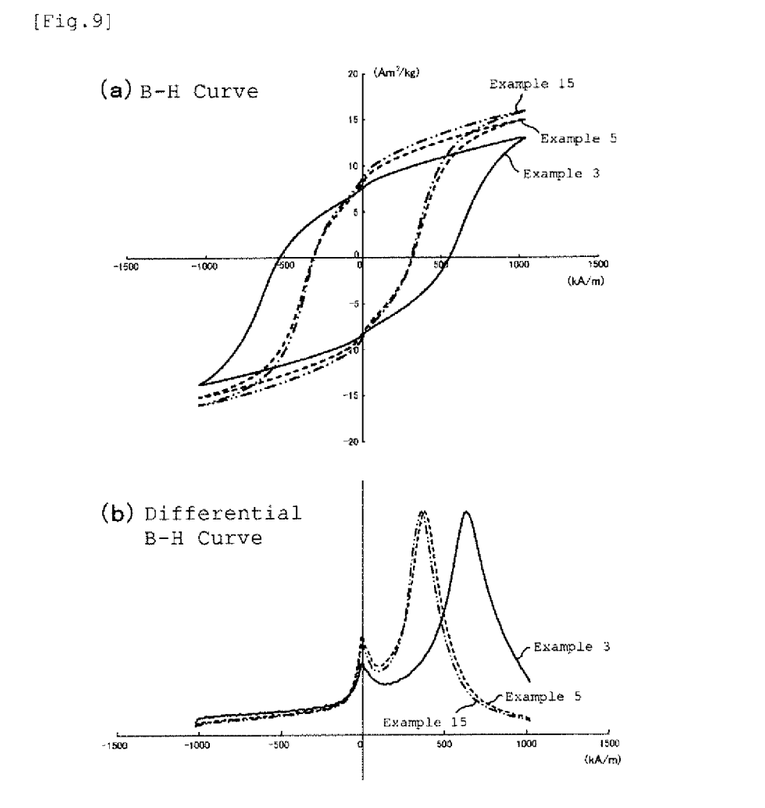
FIG. 9 shows (a) B-H curves and (b) differential B-H curves for iron-based oxide magnetic particle powders obtained in Example 3, Example 5, and Example 15.

In Examples 3-9, iron-based oxide magnetic particle powders were obtained by the same procedure as in Example 1 with the metal ion charging ratio varied. Incidentally, the molar ratios of the hydroxycarboxylic acid to the trivalent iron ion amount in the Examples were 0.119 in Example 3, 0.122 in Examples 4, 5 and 6, 0.118 in Example 7, 0.111 in Example 8, and 0.138 in Example 9. In the Examples, although the amount of the alkali aqueous solution required for neutralization differs a little depending on the charging composition, the pH values reached in the first state and the second state were made almost equal to those in Example 1. Among the Examples, Example 9 is of the monoelement substitution type, and Example 6 is of the dielement substitution type. TEM photographs of the iron-based oxide magnetic particle powders obtained in Example 3 and Example 5 are shown in FIG. 7 and FIG. 8, respectively, and (a) B-H curves and (b) differential B-H curves for the iron-based oxide magnetic particle powders obtained in Example 3 and Example 5 are shown in FIG. 9, respectively. The metal ion charging ratios and the measurement results of the mean particle diameter, etc. of the obtained iron-based oxide magnetic particle powders in the Examples are collectively shown in Table 1. In all the Examples, an iron-based oxide magnetic particle powder having an $I_L/I_H$ value of 0.7 or less was obtained, and particularly in Examples 3-7, one having an $I_L/I_H$ value of 0.53 or less was obtained. SFD was 1.30 or less in all the Examples, and it can be seen that the powders in the Examples are superior to one in the Comparative Example in coercive force distribution.

Examples 10 to 13

As Example 10, an iron-based oxide magnetic particle powder was obtained by the same procedure as in Example 1 except that Fe was added in a form of iron (III) chloride hexahydrate and Co was added in a form of cobalt (II) chloride hexahydrate. Incidentally, the precursor produced in Example 10 partially contained β-FeOOH in the ferrihydrite phase. In addition, iron-based oxide magnetic particle powders were obtained by the same procedure as in an Example 1 except that tartaric acid was used in Example 11 and malic acid was used in Example 12 as a hydroxycarboxylic acid. The molar ratios of the hydroxycarboxylic acid to the trivalent iron ion amount in the Examples are 0.122. In Example 13, an iron-based oxide magnetic particle powder was obtained by the same procedure as in Example 1 except that Al in a form of aluminum nitrate (nonahydrate) was added instead of Ga as a substituting element. The metal ion charging ratios and the measurement results of the mean particle diameter, etc. of the obtained iron-based oxide magnetic particle powders in the Examples are collectively shown in Table 1. In all the Examples, an iron-based oxide magnetic particle powder having an $I_L/I_H$ value of 0.7 or less was obtained, and particularly in Examples 10, 11 and 13, one having an $I_L/I_H$ value of 0.53 or less was obtained. SFD was 1.30 or less in all the Examples, and it can be seen that the powders in the Examples are superior to one in the Comparative Example in coercive force distribution.

Examples 14 to 16

Figure 10:
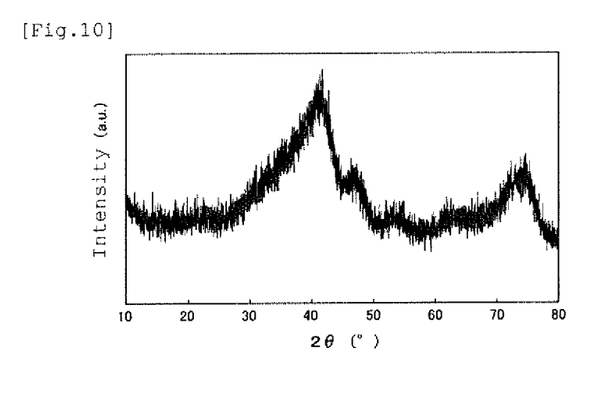
FIG. 10 shows a XRD pattern obtained with an intermediate product after a hydrothermal treatment of Example 15.
Figure 11:
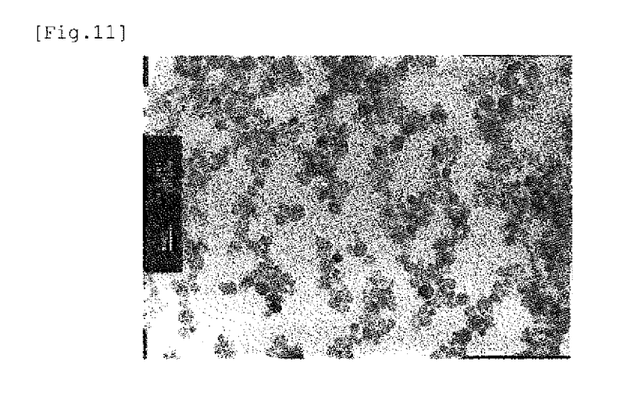
FIG. 11 is a TEM photograph of an iron-based oxide magnetic particle powder obtained in Example 15.

As Examples 14 to 16, under the same conditions as in Example 1, between Procedure 2 and Procedure 3, the slurry of the precursor after the water washing step as it was with no addition was subjected to a hydrothermal treatment using pure water as a solvent at 140° C. (Example 14), 160° C. (Example 15), or 180° C. (Example 16) for 6 hours. FIG. 10 shows an X-ray diffraction pattern of the precursor after the hydrothermal treatment of Example 15. As compared with FIG. 1, the diffraction peak is sharper and it can be seen that crystallinity of the precursor was enhanced by the hydrothermal treatment. A TEM photograph of the iron-based oxide magnetic particle powder obtained in Example 15 is shown in FIG. 11 and (a) a B-H curve and (b) a differential B-H curve for the iron-based oxide magnetic particle powder obtained in Example 15 are shown together in FIG. 9. The metal ion charging ratios and the measurement results of the mean particle diameter, etc. of the obtained iron-based oxide magnetic particle powders in the Examples are collectively shown in Table 1. By the hydrothermal treatment, an iron-based oxide magnetic particle powder having an $I_L/I_H$ value of 0.7 or less can be obtained, and it can be seen that the $I_L/I_H$ value and the SFD are reduced and improved by applying a hydrothermal treatment.

Examples 17 to 19

As Examples 17 to 19, an iron-based oxide magnetic particle powder was obtained by the same procedure as in Example 1 except that the molar ratio of citric acid to the trivalent iron ion amount was changed to 0.183 (Example 17), 0.245 (Example 18), or 0.367 (Example 19) and the sintering temperature of the precursor coated with the gel SiO$_2$ was 1065° C. The metal ion charging ratios and the measurement results of the mean particle diameter, etc. of the obtained iron-based oxide magnetic particle powders in the Examples are collectively shown in Table 1. In all the Examples, an iron-based oxide magnetic particle powder having an $I_L/I_H$ value of 0.7 or less can be obtained and the SFD are 1.30 or less, and it can be seen that the powders are superior to that of Comparative Example in coercive force distribution.

Using the iron-based oxide magnetic particle powders obtained in Example 1, Example 5, Example 15, and Comparative Example 1, magnetic tapes were produced by the procedure described above, and the magnetic characteristics of the tapes were measured. Incidentally, the dispersing time in the tape production was 60 minutes and the tape was dried in a magnetic field of an orientation magnetic field of 5.5 kOe (438 kA/m). The measurement results are shown in Table 2.

When each powder was used in a coating material and produce a medium, SQx and SFDx which indicate an enhanced output in magnetic tape characteristics showed excellent characteristics, and it can be seen that it is possible to increase recording density of a magnetic recording medium. HCx falls within the range of a preferred value as a magnetic recording medium.

It can be seen that medium characteristics are also improved with improvement of the powder.

Reference Example

Using a commercially available β iron oxyhydroxide fine crystal sol (Pairal Fe-C10 manufactured by Taki Chemical Co. Ltd.), an iron-based oxide magnetic particle powder was obtained by the same procedure as in Example 1 and Comparative Example 1 after tetraethoxy silane was added to a sol solution.

Figure 6:
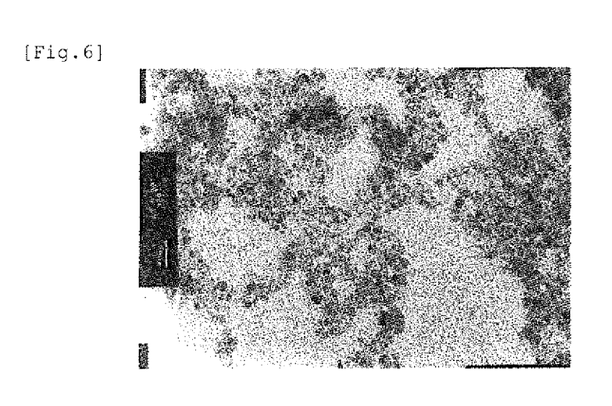
FIG. 6 is a TEM photograph of an iron-based oxide magnetic particle powder obtained in Reference Example 1.

A TEM photograph of the iron-based oxide magnetic particle powder obtained in the Reference Example is shown in FIG. 6, and the measurement results of the mean particle diameter, etc. are collectively shown in Table 1.

A B-H curve and a differential B-H curve for the iron-based oxide magnetic particle powder obtained in the Reference Example are shown together in FIG. 3, and the measurement results of the coercive force, etc. are collectively shown in Table 1.

The iron-based oxide magnetic particle powder obtained by the Reference Example had a mean particle diameter of 12.0 nm, a coefficient of variation (CV value) of 36.6%, and a number % of fine particles having a mean particle diameter of 8 nm or less of 16.8%. In the cases of Comparative Example 1 in which a ferrihydrite phase was produced as a precursor and the Reference Example in which β iron oxyhydroxide was used as a starting material, no significant difference is seen in the TEM observation results.

However, in the case of the Reference Example, no clear peak based on the higher Hc component appeared in the differential B-H curve, and it can be understood that $\varepsilon\text{-Fe}_2\text{O}_3$ crystals having a good coercive force distribution are likely to be obtained by passing the ferrihydrite phase as a precursor.

TABLE 1

| | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Charging ratio | Fe | 1.635 | 1.635 | 1.685 | 1.635 | 1.635 | 1.635 | 1.700 | 1.800 | 1.450 | 1.635 | 1.635 |
| | Ga | 0.265 | 0.265 | 0.265 | 0.265 | 0.265 | 0.265 | 0.200 | 0.100 | 0.550 | 0.265 | 0.265 |
| | Co | 0.050 | 0.050 | 0.025 | 0.025 | 0.040 | 0.000 | 0.040 | 0.040 | 0.000 | 0.050 | 0.050 |
| | Ti | 0.050 | 0.050 | 0.025 | 0.075 | 0.060 | 0.100 | 0.060 | 0.060 | 0.000 | 0.050 | 0.050 |
| Hydroxy-carboxylic acid | | Citric acid | Citric acid | Citric acid | Citric acid | Citric acid | Citric acid | Citric acid | Citric acid | Citric acid | Citric acid | Tartaric acid |
| TEM mean particle diameter (nm) | | 16.3 | 21.3 | 18.3 | 16.0 | 16.4 | 14.2 | 16.0 | 15.8 | 16.6 | 18.0 | 17.3 |
| Coefficient of variation of mean particle diameter (%) | | 38.2 | 35.0 | 38.5 | 37.8 | 38.2 | 37.8 | 38.8 | 39.9 | 38.1 | 38.9 | 39.8 |
| coercive force Hc (kA/m) | | 255.7 | 316.6 | 541.4 | 398.8 | 318.1 | 546.5 | 358.4 | 425.8 | 323.0 | 327.5 | 292.0 |
| coercive force Hc (Oe) | | 3213 | 3979 | 6804 | 5012 | 3997 | 6867 | 4504 | 5351 | 4059 | 4116 | 3670 |
| Saturation magnetization σs (Am²/kg) | | 15.3 | 15.1 | 13.4 | 13.9 | 15.1 | 11.8 | 13.3 | 9.8 | 15.7 | 16.1 | 15.6 |
| $I_L/I_H$ | | 0.65 | 0.34 | 0.32 | 0.37 | 0.43 | 0.45 | 0.51 | 0.63 | 0.61 | 0.40 | 0.48 |
| SFD | | 1.19 | 0.77 | 0.67 | 0.70 | 0.79 | 1.04 | 0.86 | 0.98 | 1.28 | 0.84 | 0.86 |

| | | Example 12 | Example 13 | Example 14 | Example 15 | Example 16 | Example 17 | Example 18 | Example 19 | Comparative Example 1 | Reference Example |
|---|---|---|---|---|---|---|---|---|---|---|---|
| Charging ratio | Fe | 1.635 | 1.635 | 1.635 | 1.635 | 1.635 | 1.635 | 1.635 | 1.635 | 1.635 | — |
| | Ga | 0.265 | Al:0.265 | 0.265 | 0.265 | 0.265 | 0.265 | 0.265 | 0.265 | 0.265 | — |
| | Co | 0.050 | 0.050 | 0.050 | 0.050 | 0.050 | 0.050 | 0.050 | 0.050 | 0.050 | — |
| | Ti | 0.050 | 0.050 | 0.050 | 0.050 | 0.050 | 0.050 | 0.050 | 0.050 | 0.050 | — |
| Hydroxy-carboxylic acid | | Malic acid | Citric acid | Citric acid | Citric acid | Citric acid | Citric acid | Citric acid | Citric acid | — | — |
| TEM mean particle diameter (nm) | | 17.0 | 18.6 | 14.7 | 17.0 | 16.9 | 16.3 | 15.9 | 15.8 | 16.1 | 12.0 |
| Coefficient of variation of mean particle diameter (%) | | 42.1 | 38.4 | 45.9 | 38.3 | 45.5 | 39.9 | 38.9 | 38.2 | 48.4 | 36.6 |

TABLE 1-continued

| | | | | | | | | | | |
|---|---|---|---|---|---|---|---|---|---|---|
| coercive force Hc (kA/m) | 288.3 | 350.5 | 311.6 | 316.7 | 292.0 | 297.6 | 295.0 | 327.5 | 277.0 | 263.6 |
| coercive force Hc (Oe) | 3623 | 4404 | 3916 | 3980 | 3669 | 3740 | 3707 | 4115 | 3481 | 3312 |
| saturation magnetization σs (Am$^2$/kg) | 15.3 | 9.9 | 15.3 | 15.8 | 16.0 | 16.1 | 15.8 | 15.6 | 15.9 | 4.9 |
| $I_L/I_H$ | 0.62 | 0.53 | 0.42 | 0.41 | 0.47 | 0.54 | 0.57 | 0.53 | 0.82 | Unmeasurable |
| SFD | 1.08 | 0.96 | 0.76 | 0.74 | 0.83 | 0.89 | 0.94 | 0.92 | 1.51 | Unmeasurable |

TABLE 2

Dispersing time: 60 minutes

| | Tape characteristics (VSM 10 kOe) | | | | |
|---|---|---|---|---|---|
| | Hcx (Oe) | Hcx (kA/m) | SFDx | Bhmax | SQx |
| Example 1 | 3562 | 283.5 | 1.02 | 0.32 | 0.73 |
| Example 5 | 4185 | 333.0 | 0.76 | 0.35 | 0.75 |
| Example 15 | 4071 | 324.0 | 0.71 | 0.37 | 0.76 |
| Comparative Example 1 | 3813 | 303.4 | 1.30 | 0.29 | 0.68 |

The invention claimed is:

1. An iron-based oxide magnetic particle powder in which a part of Fe sites of ε-Fe$_2$O$_3$ is substituted with another metal element, having a mean particle diameter as measured by a transmission electron microscopy of 10 nm to 30 nm, wherein an $I_L/I_H$ value defined below is 0.7 or less:

wherein $I_H$ is the intensity of a peak appearing on the higher magnetic field side in a differential B-H curve obtained by numerically differentiating a B-H curve obtained by a measurement under conditions of an applied magnetic field of 1035 kA/m (13 kOe), an M measurement range of 0.005 A·m$^2$ (5 emu), a step bit of 80 bit, a time constant of 0.03 sec, and a wait time of 0.1 sec, and $I_L$ is the intensity of the intercept on the vertical axis at the zero magnetic field in the differential B-H curve.

2. The iron-based oxide magnetic particle powder according to claim 1, wherein the $I_L/I_H$ value is 0.53 or less.

3. The iron-based oxide magnetic particle powder according to claim 1, wherein the iron-based oxide is represented by ε-A$_x$B$_y$C$_z$Fe$_{2-x-y-z}$O$_3$ (wherein, A represents at least one divalent metal element selected from Co, Ni, Mn, and Zn, B represents at least one tetravalent metal element selected from Ti and Sn, C represents at least one trivalent metal element selected from In, Ga, and Al, and 0<x, y, z<1 are satisfied).

4. The iron-based oxide magnetic particle powder according to claim 1 or 2, wherein the iron-based oxide is represented by ε-B$_y$C$_z$Fe$_{2-y-z}$O$_3$ (wherein, B represents at least one tetravalent metal element selected from Ti and Sn, C represents at least one trivalent metal element selected from In, Ga, and Al, and 0<y, z<1 are satisfied).

5. The iron-based oxide magnetic particle powder according to claim 1, wherein the iron-based oxide is represented by ε-C$_z$Fe$_{2-z}$O$_3$ (wherein, C represents at least one trivalent metal element selected from In, Ga, and Al, and 0<z<1 are satisfied).

6. A coating material for a coating type magnetic recording medium, wherein the iron-based oxide magnetic particle powder as set forth in claim 1 is used.

7. A magnetic recording medium, wherein the iron-based oxide magnetic particle powder as set forth in claim 1 is used.

8. A method for producing an iron-based oxide magnetic particle powder in which a part of Fe sites of ε-Fe$_2$O$_3$ is substituted with another metal element, having a mean particle diameter as measured by a transmission electron microscopy of 10 nm to 30 nm, the method comprising:

a first neutralization step in which an aqueous solution containing trivalent iron ions and ions of the metal for partially substituting the Fe sites is neutralized to a pH of 1.5 to 2.5;

a step in which a hydroxycarboxylic acid is added to the aqueous solution after the neutralization;

a second neutralization step in which the aqueous solution having the hydroxycarboxylic acid added is neutralized to a pH of 8.0 to 9.0;

a step in which an iron oxyhydroxide containing the substituting metal element produced in the second neutralization step is subjected to water washing;

a step in which the iron oxyhydroxide containing the substituting metal element after the water washing is coated with a silicon oxide; and a step in which the iron oxyhydroxide containing the substituting metal element coated with the silicon oxide is heated to produce an iron oxide containing the substituting metal element coated with the silicon oxide, wherein a value of $I_L/I_H$ defined below is 0.7 or less: wherein $I_H$ is the intensity of a peak appearing on the higher magnetic field side in a differential B-H curve obtained by numerically differentiating a B-H curve obtained by a measurement under conditions of an applied magnetic field of 1035 kA/m (13 kOe), an M measurement range of 0.005 A*m$^2$ (5 emu), a step bit of 80 bit, a time constant of 0.03 sec, and a wait time of 0.1 sec, and $I_L$ is the intensity of the intercept on the vertical axis at the zero magnetic field in the differential B-H curve.

9. The method for producing an iron-based oxide magnetic particle powder according to claim 8, wherein the value of $I_L/I_H$ is 0.53 or less.

10. The method for producing an iron-based oxide magnetic particle powder according to claim 8, wherein the iron-based oxide is represented by ε-A$_x$B$_y$C$_z$Fe$_{2-x-y-z}$O$_3$ (wherein, A represents at least one divalent metal element selected from Co, Ni, Mn, and Zn, B represents at least one tetravalent metal element selected from Ti and Sn, C represents at least one trivalent metal element selected from In, Ga, and Al, and 0<x, y, z<1 are satisfied).

11. The method for producing an iron-based oxide magnetic particle powder according to claim 8, wherein the iron-based oxide is represented by ε-B$_y$C$_z$Fe$_{2-y-z}$O$_3$ (wherein, B represents at least one tetravalent metal element selected from Ti and Sn, C represents at least one trivalent metal element selected from In, Ga, and Al, and 0<y, z<1 are satisfied).

12. The method for producing an iron-based oxide magnetic particle powder according to claim 8, wherein the iron-based oxide is represented by $\varepsilon\text{-}C_zFe_{2-z}O_3$ (wherein, C represents at least one trivalent metal element selected from In, Ga, and Al, and 0<z<1 are satisfied).

13. The method for producing an iron-based oxide magnetic particle powder according to claim 8, wherein the hydroxycarboxylic acid is one or more of tartaric acid, citric acid, and malic acid.

14. An iron-based oxide magnetic particle powder produced by the method for producing an iron-based oxide magnetic particle powder as set forth in claim 8.

15. A method for producing an iron-based oxide magnetic particle powder in which a part of Fe sites of $\varepsilon\text{-}Fe_2O_3$ is substituted with another metal element, having a mean particle diameter as measured by a transmission electron microscopy of 10 nm to 30 nm, the method comprising:
   a first neutralization step in which an aqueous solution containing trivalent iron ions and ions of the metal for partially substituting the Fe sites is neutralized to a pH of 1.5 to 2.5;
   a step in which a hydroxycarboxylic acid is added to the aqueous solution after the neutralization;
   a second neutralization step in which the aqueous solution having the hydroxycarboxylic acid added is neutralized to a pH of 8.0 to 9.0;
   a step in which an iron oxyhydroxide containing the substituting metal element produced in the second neutralization step is subjected to water washing;
   a step in which the iron oxyhydroxide containing the substituting metal element after the water washing is coated with a silicon oxide;
   a step in which the iron oxyhydroxide containing the substituting metal element coated with the silicon oxide is heated to produce an iron oxide containing the substituting metal element coated with the silicon oxide; and
   a step in which the silicon oxide coating the iron oxide containing the substituting metal element is removed, wherein a value of $I_L/I_H$ defined below is 0.7 or less: wherein $I_H$ is the intensity of a peak appearing on the higher magnetic field side in a differential B-H curve obtained by numerically differentiating a B-H curve obtained by a measurement under conditions of an applied magnetic field of 1035 kA/m (13 kOe), an M measurement range of 0.005 A*m² (5 emu), a step bit of 80 bit, a time constant of 0.03 sec, and a wait time of 0.1 sec, and $I_L$ is the intensity of the intercept on the vertical axis at the zero magnetic field in the differential B-H curve.

16. A method for producing an iron-based oxide magnetic particle powder in which a part of Fe sites of $\varepsilon\text{-}Fe_2O_3$ is substituted with another metal element, having a mean particle diameter as measured by a transmission electron microscopy of 10 nm to 30 nm, the method comprising:
   a first neutralization step in which an aqueous solution containing trivalent iron ions and ions of the metal for partially substituting the Fe sites is neutralized to a pH of 1.5 to 2.5;
   a step in which a hydroxycarboxylic acid is added to the aqueous solution after the neutralization;
   a second neutralization step in which the aqueous solution having the hydroxycarboxylic acid added is neutralized to a pH of 8.0 to 9.0;
   a step in which an iron oxyhydroxide containing the substituting metal element produced in the second neutralization step is subjected to water washing;
   a step in which the iron oxyhydroxide containing the substituting metal element after the water washing is coated with a silicon oxide;
   a step in which the iron oxyhydroxide containing the substituting metal element coated with the silicon oxide is heated to produce an iron oxide containing the substituting metal element coated with the silicon oxide; and
   a step in which the silicon oxide coating the iron oxide containing the substituting metal element is removed and then the iron oxide containing the substituting metal element is classified, wherein a value of $I_L/I_H$ defined below is 0.7 or less: wherein $I_H$ is the intensity of a peak appearing on the higher magnetic field side in a differential B-H curve obtained by numerically differentiating a B-H curve obtained by a measurement under conditions of an applied magnetic field of 1035 kA/m (13 kOe), an M measurement range of 0.005 A*m² (5 emu), a step bit of 80 bit, a time constant of 0.03 sec, and a wait time of 0.1 sec, and $I_L$ is the intensity of the intercept on the vertical axis at the zero magnetic field in the differential B-H curve.

17. A method for producing an iron-based oxide magnetic particle powder in which a part of Fe sites of $\varepsilon\text{-}Fe_2O_3$ is substituted with another metal element, having a mean particle diameter as measured by a transmission electron microscopy of 10 nm to 30 nm, the method comprising:
   a first neutralization step in which an aqueous solution containing trivalent iron ions and ions of the metal for partially substituting the Fe sites is neutralized to a pH of 1.5 to 2.5;
   a step in which a hydroxycarboxylic acid is added to the aqueous solution after the neutralization;
   a second neutralization step in which the aqueous solution having the hydroxycarboxylic acid added is neutralized to a pH of 8.0 to 9.0;
   a step in which an iron oxyhydroxide containing the substituting metal element produced in the second neutralization step is subjected to water washing;
   a step in which a hydrothermal treatment at 120° C. to 180° C. is applied to the iron oxyhydroxide containing the substituting metal element after the water washing;
   a step in which the iron oxyhydroxide containing the substituting metal element after the hydrothermal treatment is coated with a silicon oxide;
   a step in which the iron oxyhydroxide containing the substituting metal element coated with the silicon oxide is heated to produce an iron oxide containing the substituting metal element coated with the silicon oxide; and
   a step in which the silicon oxide coating the iron oxide containing the substituting metal element is removed, wherein a value of $I_L/I_H$ defined below is 0.7 or less: wherein $I_H$ is the intensity of a peak appearing on the higher magnetic field side in a differential B-H curve obtained by numerically differentiating a B-H curve obtained by a measurement under conditions of an applied magnetic field of 1035 kA/m (13 kOe), an M measurement range of 0.005 A*m² (5 emu), a step bit of 80 bit, a time constant of 0.03 sec, and a wait time of 0.1 sec, and $I_L$ is the intensity of the intercept on the vertical axis at the zero magnetic field in the differential B-H curve.

* * * * *